United States Patent
Peng et al.

(10) Patent No.: US 11,640,105 B2
(45) Date of Patent: May 2, 2023

(54) PROJECTOR AND LIGHT SOURCE MODULE THEREOF

(71) Applicant: Coretronic Corporation, Hsin-Chu (TW)

(72) Inventors: Chien-Ming Peng, Hsin-Chu (TW); Yen-Po Chang, Hsin-Chu (TW); Mao-Min Fu, Hsin-Chu (TW); Wei-Min Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/511,530

(22) Filed: Oct. 26, 2021

(65) Prior Publication Data

US 2023/0015029 A1    Jan. 19, 2023

(30) Foreign Application Priority Data

Jul. 19, 2021    (CN) .......................... 202110812894.4

(51) Int. Cl.
*G03B 21/20* (2006.01)
*G03B 21/16* (2006.01)
*G02B 13/16* (2006.01)

(52) U.S. Cl.
CPC ......... *G03B 21/2013* (2013.01); *G02B 13/16* (2013.01); *G03B 21/16* (2013.01)

(58) Field of Classification Search
CPC ..... G03B 21/2013; G03B 21/16; G02B 13/16
USPC .......................................................... 353/52
See application file for complete search history.

(56) References Cited

U.S. PATENT DOCUMENTS

2018/0364552 A1    12/2018    Chien et al.

FOREIGN PATENT DOCUMENTS

| CN | 100561809 | 11/2009 | |
| CN | 106125474 A | * 11/2016 | ........... G03B 21/142 |
| TW | 202008068 | 2/2020 | |

OTHER PUBLICATIONS

NPL: CN_106125474 and Machine Translation (Year: 2022).*
"Office Action of Taiwan Counterpart Application", dated May 2, 2022, p. 1-p. 8.

* cited by examiner

*Primary Examiner* — Jerry L Brooks
(74) *Attorney, Agent, or Firm* — JCIPRNET

(57) ABSTRACT

A projector includes a light source module, a light valve, and a projection lens. The light source module is adapted to provide an illumination light beam and includes a base having first and second side surfaces, first and second color light-emitting units respectively disposed on the first and second side surfaces, and first and second heat dissipation structures respectively connected to the first and second color light-emitting units. The first and second heat dissipation structures are separated from each other and define an accommodation space together. The light valve is located on a transmission path of the illumination light beam and adapted to convert the illumination light beam into an image light beam. The projection lens is located on a transmission path of the image light beam and adapted to project the image light beam.

20 Claims, 9 Drawing Sheets

PROJECTOR AND LIGHT SOURCE MODULE THEREOF

CROSS-REFERENCE TO RELATED APPLICATION

This application claims the priority benefit of Chinese application no. 202110812894.4, filed on Jul. 19, 2021. The entirety of the above-mentioned patent application is hereby incorporated by reference herein and made a part of this specification.

BACKGROUND

Technical Field

The disclosure relates to a display device and an optical module thereof. Particularly, the disclosure relates to a projector and a light source module thereof.

Description of Related Art

Currently in most of projectors, light required for projection is provided by utilizing light-emitting diode light sources. The light-emitting diode light sources in a projector generally includes red, green, and blue light-emitting units, which have different heat generation and thus have different heat dissipation requirements. On the other hand, as design of the projector trends toward miniaturization, configuration space inside the projector is limited. Therefore, a heat dissipation design for the light-emitting diode light sources within a limited space in which the red, green, and blue light-emitting units can each have good heat dissipation efficiency along with the structural strength of the heat dissipation member is an important issue in the structural design of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector and a light source module thereof, in which heat dissipation can be performed on a light source module within a limited configuration space by utilizing a heat dissipation structure.

To achieve one, some, or all of the above objectives or other objectives, an embodiment of the disclosure provides a projector. The projector includes a light source module, a light valve, and a projection lens. The light source module is adapted to provide an illumination light beam and includes a base, a first color light-emitting unit, a second color light-emitting unit, a first heat dissipation structure, and a second heat dissipation structure. The base has a first side surface and a second side surface. The first color light-emitting unit is disposed on the first side surface of the base. The second color light-emitting unit is disposed on the second side surface of the base. The first heat dissipation structure is connected to the first color light-emitting unit. The second heat dissipation structure is connected to the second color light-emitting unit. The first heat dissipation structure and the second heat dissipation structure are separated from each other and define an accommodation space together. The light valve is located on a transmission path of the illumination light beam and is adapted to convert the illumination light beam into an image light beam. The projection lens is located on a transmission path of the image light beam and is adapted to project the image light beam.

To achieve one, some, or all of the above objectives or other objectives, an embodiment of the disclosure provides a light source module. The light source module includes a base, a first color light-emitting unit, a second color light-emitting unit, a first heat dissipation structure, and a second heat dissipation structure. The base has a first side surface and a second side surface. The first color light-emitting unit is disposed on the first side surface of the base. The second color light-emitting unit is disposed on the second side surface of the base. The first heat dissipation structure is connected to the first color light-emitting unit. The second heat dissipation structure is connected to the second color light-emitting unit. The first heat dissipation structure and the second heat dissipation structure are separated from each other and define an accommodation space together.

Based on the foregoing, the embodiments of the disclosure have at least one of the following advantages or effects. The first heat dissipation structure and the second heat dissipation structure separated from each other are respectively configured to perform heat dissipation on the first color light-emitting unit and the second color light-emitting unit, to prevent heat from being conducted between the first heat dissipation structure and the second heat dissipation structure, affecting the normal heat dissipation of the first color light-emitting unit and/or the second color light-emitting unit. In addition, the accommodation space defined by the first heat dissipation structure and the second heat dissipation structure together may be configured to accommodate another heat dissipation structure (e.g., a third heat dissipation structure), for heat dissipation to be performed on another light-emitting unit (e.g., a third color light-emitting unit) within a limited configuration space by utilizing the another heat dissipation structure.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
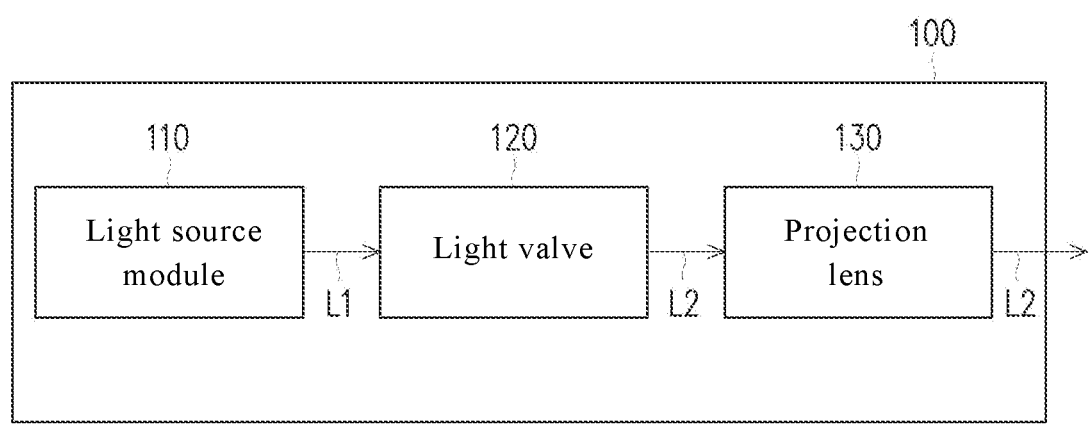
FIG. 1 is a schematic view of a projector according to an embodiment of the disclosure.

FIG. 1 is a schematic view of a projector according to an embodiment of the disclosure. With reference to FIG. 1, a projector 100 of this embodiment includes a light source module 110, a light valve 120, and a projection lens 130. The light source module 110 is adapted to provide an illumination light beam L1. The light valve 120 is located on a transmission path of the illumination light beam L1 and is adapted to convert the illumination light beam L1 into an image light beam L2. The projection lens 130 is located on a transmission path of the image light beam L2 and is adapted to project the image light beam L2 to the outside of the projector 100.

Figure 2:
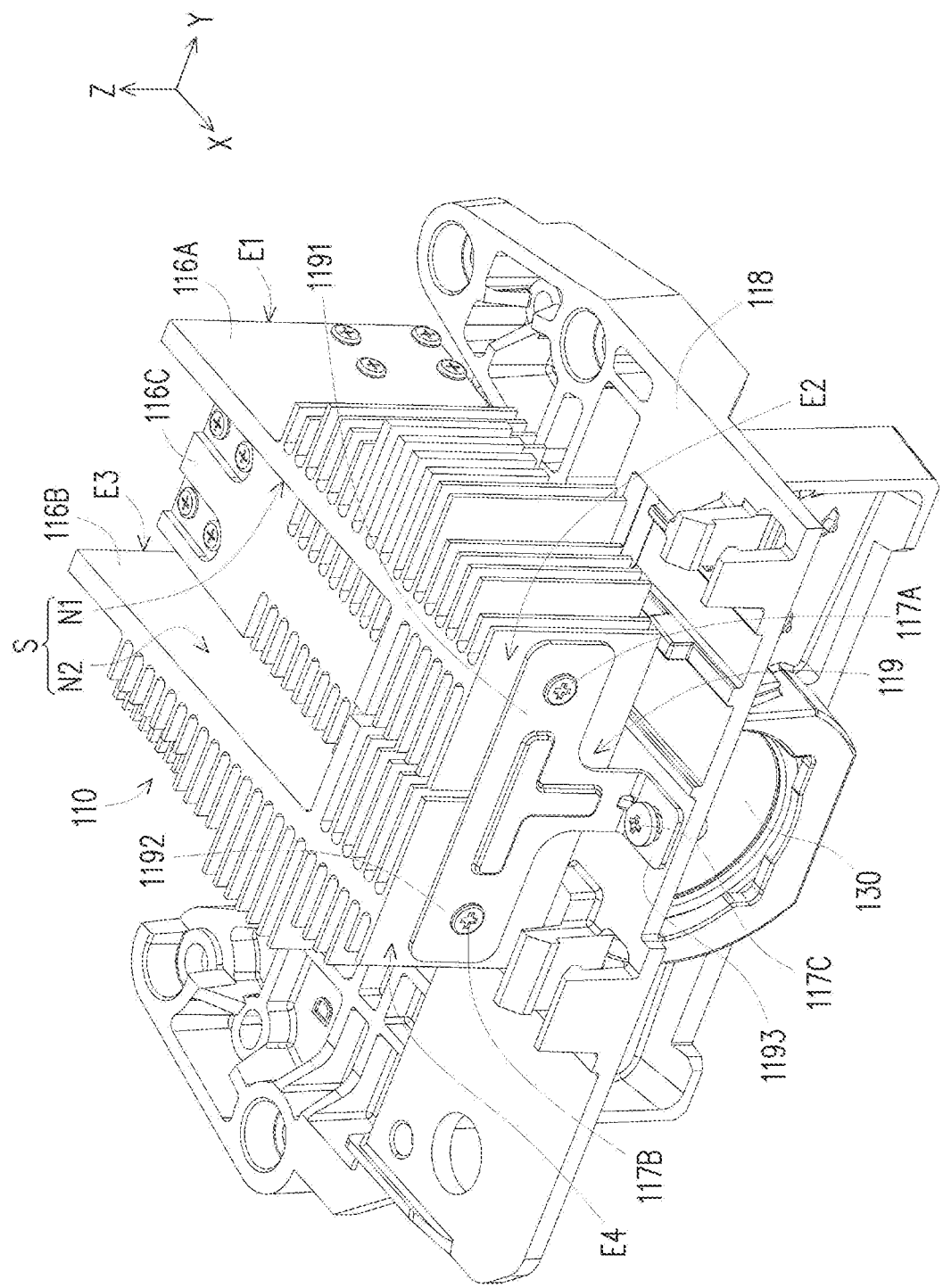
FIG. 2 is a perspective view of partial members of the projector of FIG. 1.
Figure 3:
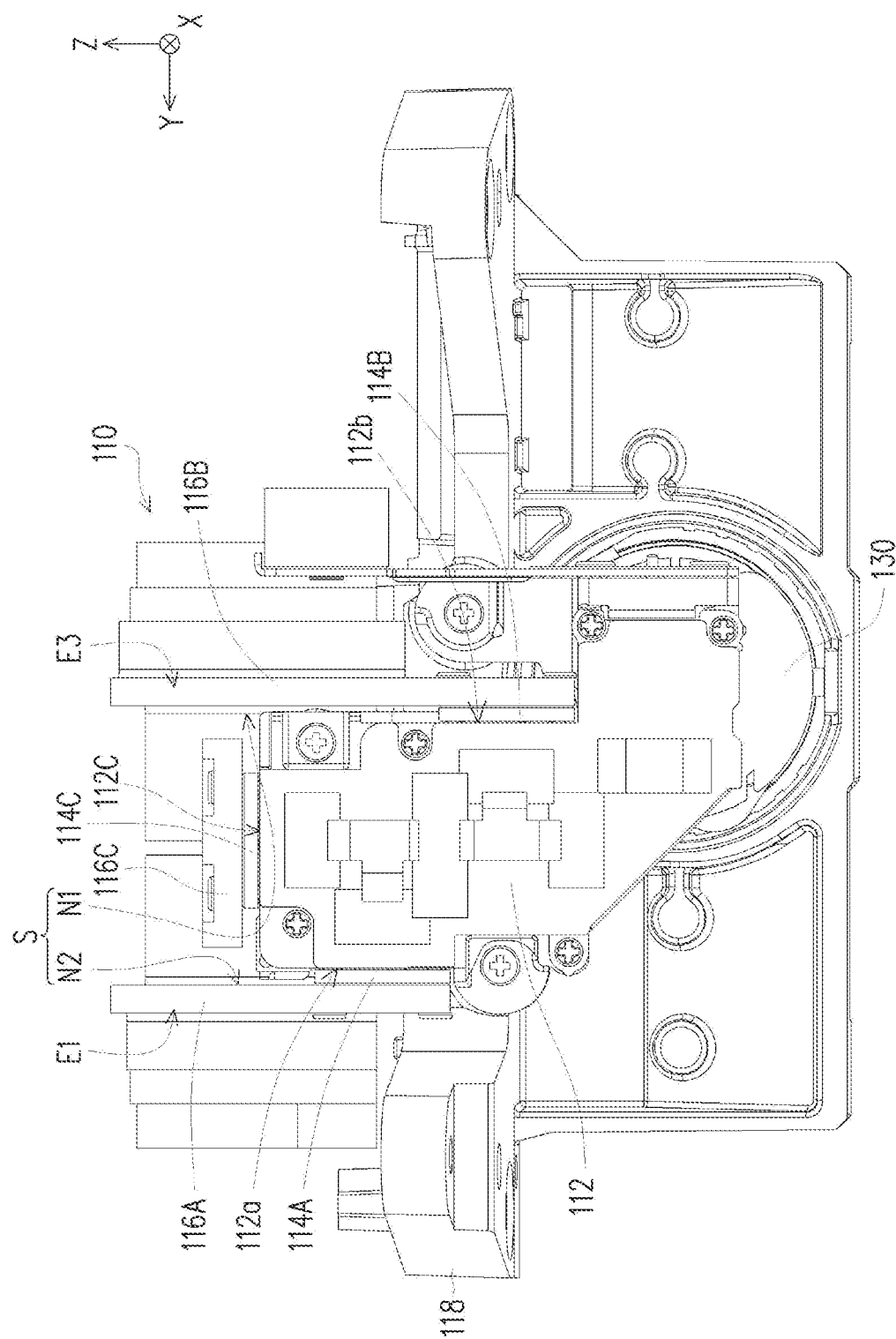
FIG. 3 is a rear view of partial members of the projector of FIG. 2.

FIG. 2 is a perspective view of partial members of the projector of FIG. 1. FIG. 3 is a rear view of partial members of the projector of FIG. 2. With reference to FIG. 2 and FIG. 3, the light source module 110 of this embodiment includes a base 112, a first color light-emitting unit 114A, and a second color light-emitting unit 114B. The first color light-emitting unit 114A and the second color light-emitting unit 114B are, for example, respectively a green light-emitting diode element and a red light-emitting diode element. The base 112 has a first side surface 112a and a second side surface 112b. The first color light-emitting unit 114A is disposed on the first side surface 112a of the base 112, and the second color light-emitting unit 114B is disposed on the second side surface 112b of the base 112. The light source module 110 further includes a first heat dissipation structure 116A and a second heat dissipation structure 116B. The first heat dissipation structure 116A and the second heat dissipation structure 116B are, for example, heat dissipation fin groups. The first heat dissipation structure 116A is heat-conductively connected to the first color light-emitting unit 114A, and the second heat dissipation structure 116B is heat-conductively connected to the second color light-emitting unit 114B. The first heat dissipation structure 116A and the second heat dissipation structure 116B are separated from each other. The first heat dissipation structure 116A and the second heat dissipation structure 116B define an accommodation space S together. In addition, the light source module 110 also includes a third color light-emitting unit 114C and a third heat dissipation structure 116C, and the base 112 also has a third side surface 112C. The third color light-emitting unit 114C is disposed on the third side surface 112C of the base 112. The third heat dissipation structure 116C is heat-conductively connected to the third color light-emitting unit 114C. Moreover, the third heat dissipation structure 116C is accommodated in the accommodation space S defined by the first heat dissipation structure 116A and the second heat dissipation structure 116B. In this embodiment, the third color light-emitting unit 114C is, for example, a blue light-emitting diode element, and the third heat dissipation structure 116C is, for example, a heat dissipation fin group. The third heat dissipation structure 116C is separated from the first heat dissipation structure 116A and the second heat dissipation structure 116B.

As described above, the first heat dissipation structure 116A, the second heat dissipation structure 116B, and the third heat dissipation structure 116C separated from each other are configured for dissipating heat generated respectively by the first color light-emitting unit 114A, the second color light-emitting unit 114B, and the third color light-emitting unit 114C, to prevent heat from being conducted between the first heat dissipation structure 116A, the second heat dissipation structure 116B, and the third heat dissipation structure 116C, affecting the normal heat dissipation of the first color light-emitting unit 114A, the second color light-emitting unit 114B, and/or the third color light-emitting unit 114C. In addition, the accommodation space S defined by the first heat dissipation structure 116A and the second heat dissipation structure 116B together is configured to accommodate the third heat dissipation structure 116C, for heat dissipation to be performed on the third color light-emitting unit 114C within a limited configuration space by utilizing the third heat dissipation structure 116C.

Further, since the green light-emitting diode element (the first color light-emitting unit 114A) and the red light-emitting diode element (the second color light-emitting unit 114B) generate more heat, and the blue light-emitting diode element (the third color light-emitting unit 114C) generates less heat, the first heat dissipation structure 116A and the second heat dissipation structure 116B respectively corresponding to the green light-emitting diode element (the first color light-emitting unit 114A) and the red light-emitting diode element (the second color light-emitting unit 114B) may each have a greater volume. In addition, the third heat dissipation structure 116C corresponding to the blue light-emitting diode element (the third color light-emitting unit 114C) may have a smaller volume and may be accommodated in the accommodation space S between the first heat dissipation structure 116A and the second heat dissipation structure 116B.

In this embodiment, the first heat dissipation structure 116A has a first recess N1 and the second heat dissipation structure 116B has a second recess N2. The first recess N1 and the second recess N2 form the accommodation space S together to accommodate the third heat dissipation structure 116C. Furthermore, the first recess N1 and the second recess N2 may be L shape. In other embodiments, the first heat dissipation structure 116A and the second heat dissipation structure 116B may have other appropriate shapes, which is not limited by the disclosure.

In addition, with reference to FIG. 2, the light source module 110 of this embodiment further includes a frame 118 and a connector 119. The base 112 is disposed on the frame 118. The first heat dissipation structure 116A has a first fixed end E1 and a first free end E2 opposite to each other. The second heat dissipation structure 116B has a second fixed end E3 and a second free end E4 opposite to each other. The first fixed end E1 and the second fixed end E3 are fixed on the base 112. The first free end E2 and the second free end E4 are fixed on the frame 118 by the connector 119. That is, both the first heat dissipation structure 116A and the second heat dissipation structure 116B are each in a form of a cantilever beam. Moreover, the first free end E2 of the first heat dissipation structure 116A and the second free end E4 of the second heat dissipation structure 116B are fixed by the additional connector 119. By fixing the first free end E2 and the second free end E4 by the connector 119, it is possible to prevent insufficient structural strength due to the configuration of the first heat dissipation structure 116A and the second heat dissipation structure 116B each in a form of a cantilever beam.

Figure 4:
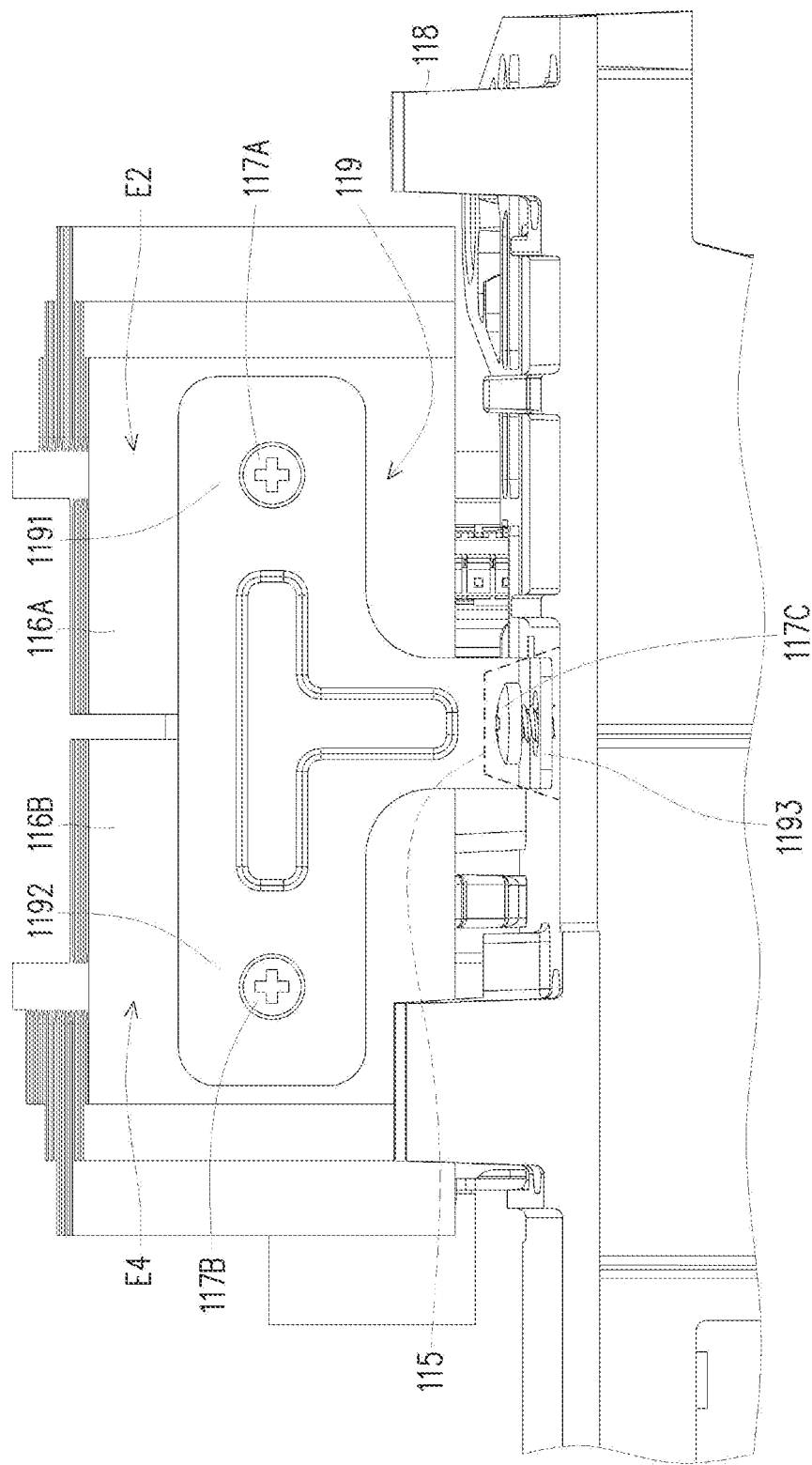
FIG. 4 is a partial front view of the light source module of FIG. 2.
Figure 5:
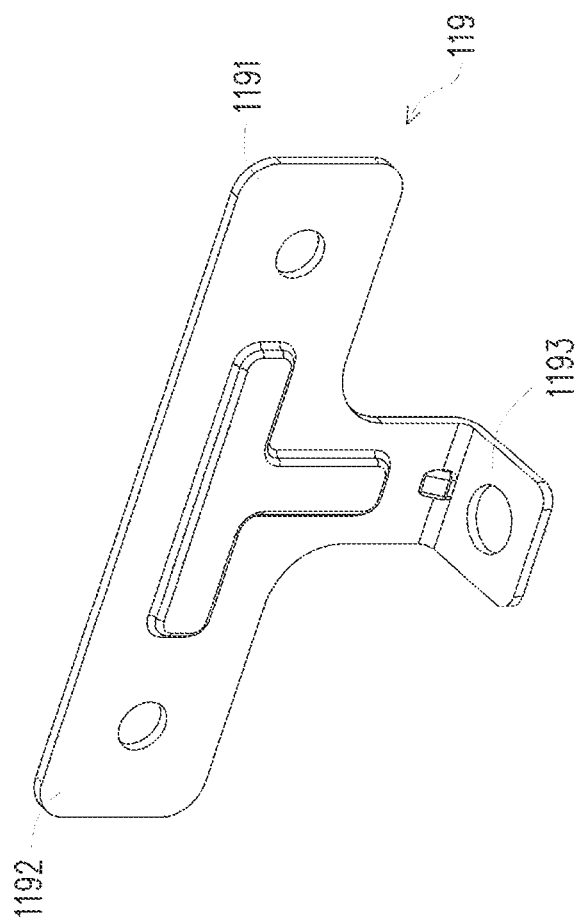
FIG. 5 is a perspective view of the connector of FIG. 2.

FIG. 4 is a partial front view of the light source module of FIG. 2. FIG. 5 is a perspective view of the connector of FIG. 2. With reference to FIG. 4 and FIG. 5, specifically, the connector 119 of this embodiment is, for example, a sheet metal element and includes a first extending portion 1191, a second extending portion 1192, and a third extending portion 1193. The first extending portion 1191, the second extending portion 1192, and the third extending portion 1193 respectively extend along different directions to form a T-shaped structure, and the first extending portion 1191, the second extending portion 1192, and the third extending portion 1193 are respectively connected to the first free end E2, the second free end E4, and the frame 118. In other embodiments, the connector 119 may have any other appropriate shape, which is not limited by the disclosure.

Figure 6:
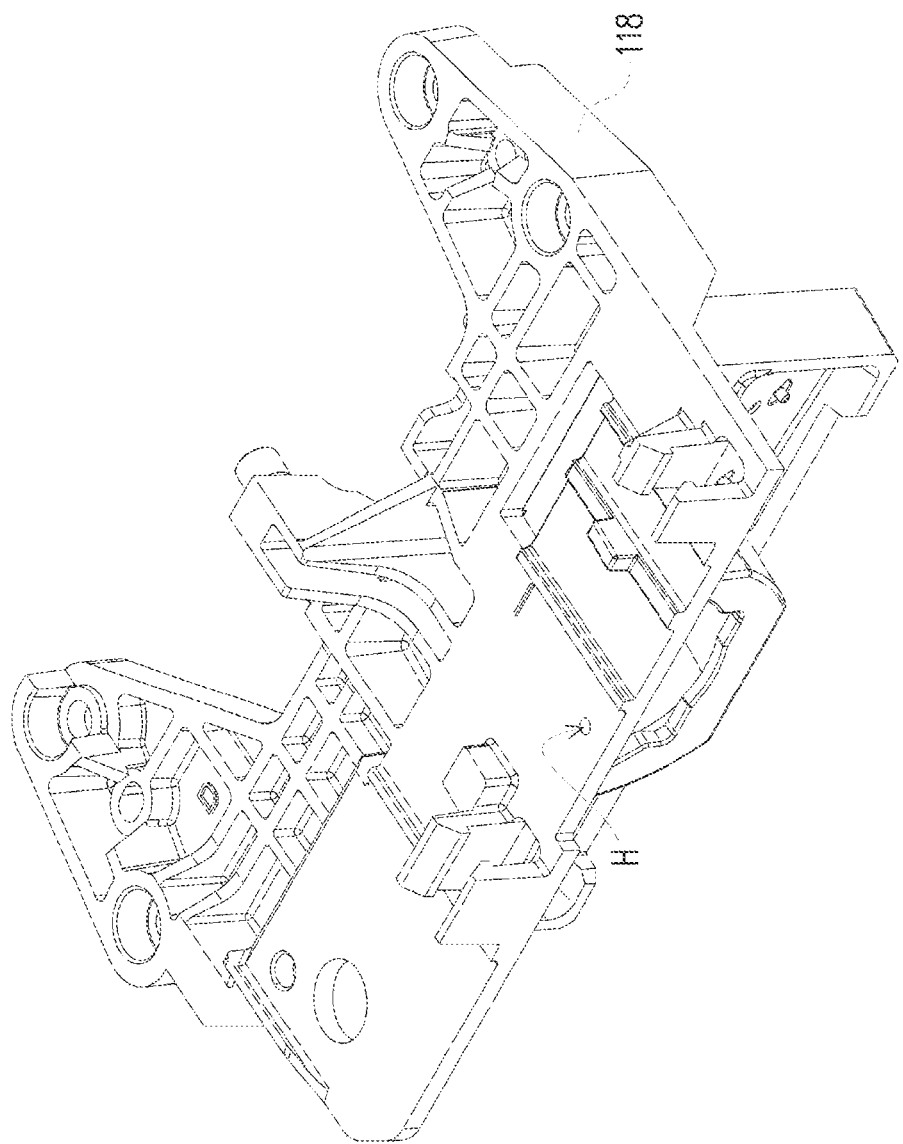
FIG. 6 is a perspective view of the frame of FIG. 2.

The light source module 110 of this embodiment further includes screw elements 117A, 117B, 117C. Each of the first extending portion 1191, the second extending portion 1192, and the third extending portion 1193 may include a screw hole (not numbered). The first extending portion 1191, the second extending portion 1192, and the third extending portion 1193 of the connector 119 are screwed to the first free end E2, the second free end E4, and the frame 118 respectively by positioning the screw elements 117A, 117B, 117C into the screw holes. FIG. 6 is a perspective view of the frame of FIG. 2. A screw hole H may be present on the frame 118 for the screw element 117C to be screwed to, as shown in FIG. 6. In addition, the light source module 110 may include an adhesive 115 (shown in FIG. 4). The adhesive 115 is glued to the frame 118 and the third extending portion 1193 of the connector 119 and covers the screw element 117C to firmly fix the third extending portion 1193 on the frame 118. Moreover, with reference to FIG. 4, FIG. 5, FIG. 6, FIG. 7, the third extending portion 1193 of the connector 119 is bent into a L shape, such that the third extending portion 1193 is able to be firmly fixed to the frame 118 by the screw element 117C.

Figure 7:
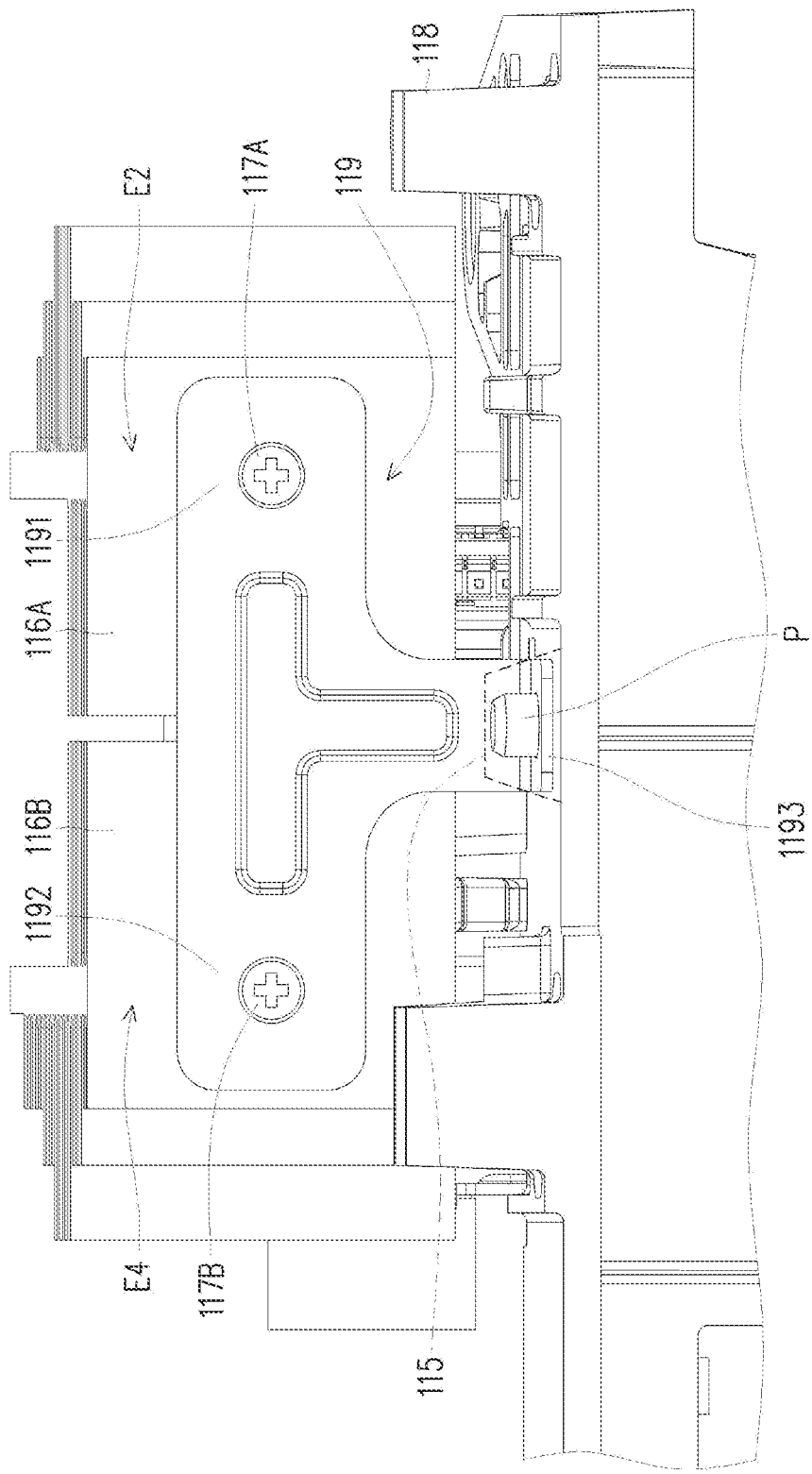
FIG. 7 is a partial front view of a light source module according to another embodiment of the disclosure.
Figure 8:
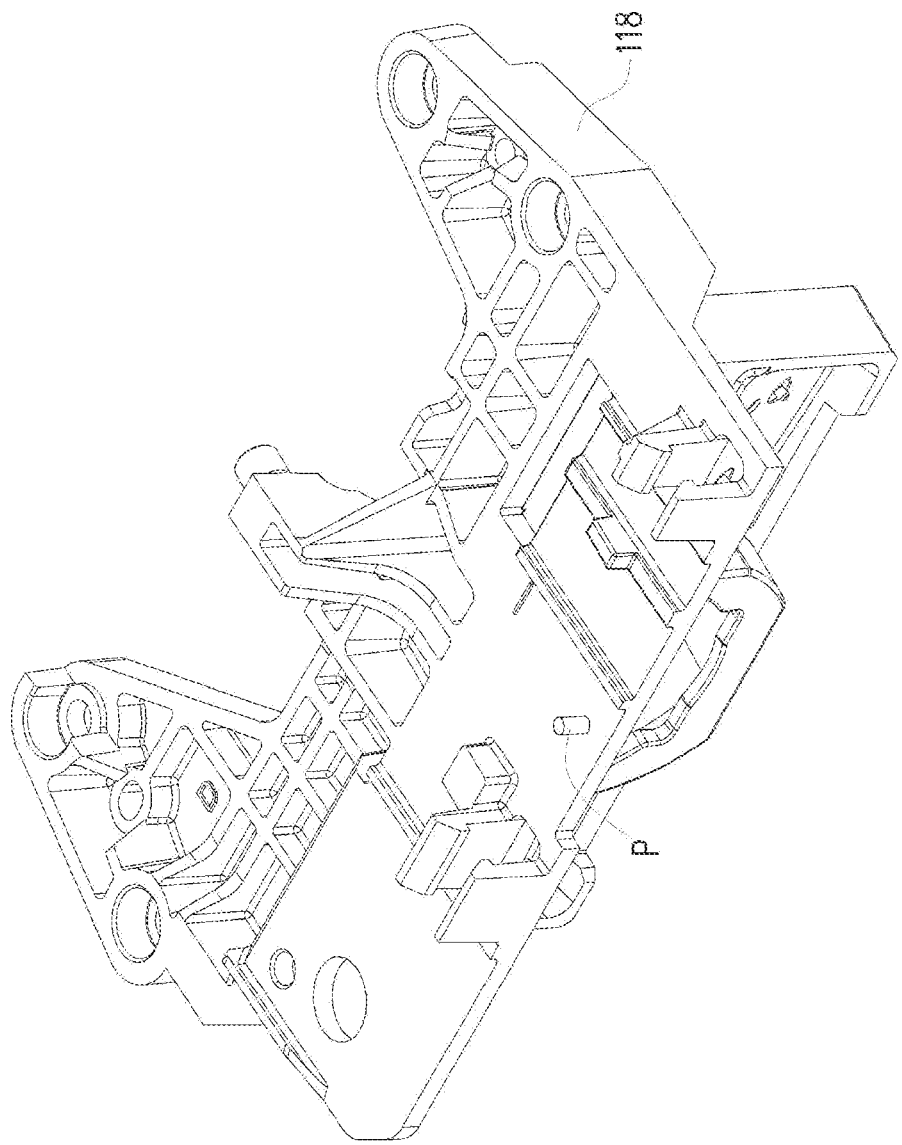
FIG. 8 is a perspective view of the frame of FIG. 7.

In the disclosure, the way of fixing the third extending portion 1193 on the frame 118 is not limited, which is described below with reference to the drawings. FIG. 7 is a partial front view of a light source module according to another embodiment of the disclosure. FIG. 8 is a perspective view of the frame of FIG. 7. The difference between the embodiment as shown in FIG. 7 and FIG. 8 and the embodiment described above lies in that the frame 118 of FIG. 7 and FIG. 8 has a protruding pillar P, which replaces the screw element 117C of the embodiment described above. The protruding pillar P is disposed through the screw hole (not numbered) of the third extending portion 1193 of the connector 119 to position the third extending portion 1193 on the frame 118, so as to fix the frame 118 with the connector 119. The adhesive 115 is glued to the frame 118 and the third extending portion 1193 of the connector 119 and covers the protruding pillar P to firmly fix the third extending portion 1193 on the frame 118.

Figure 9:
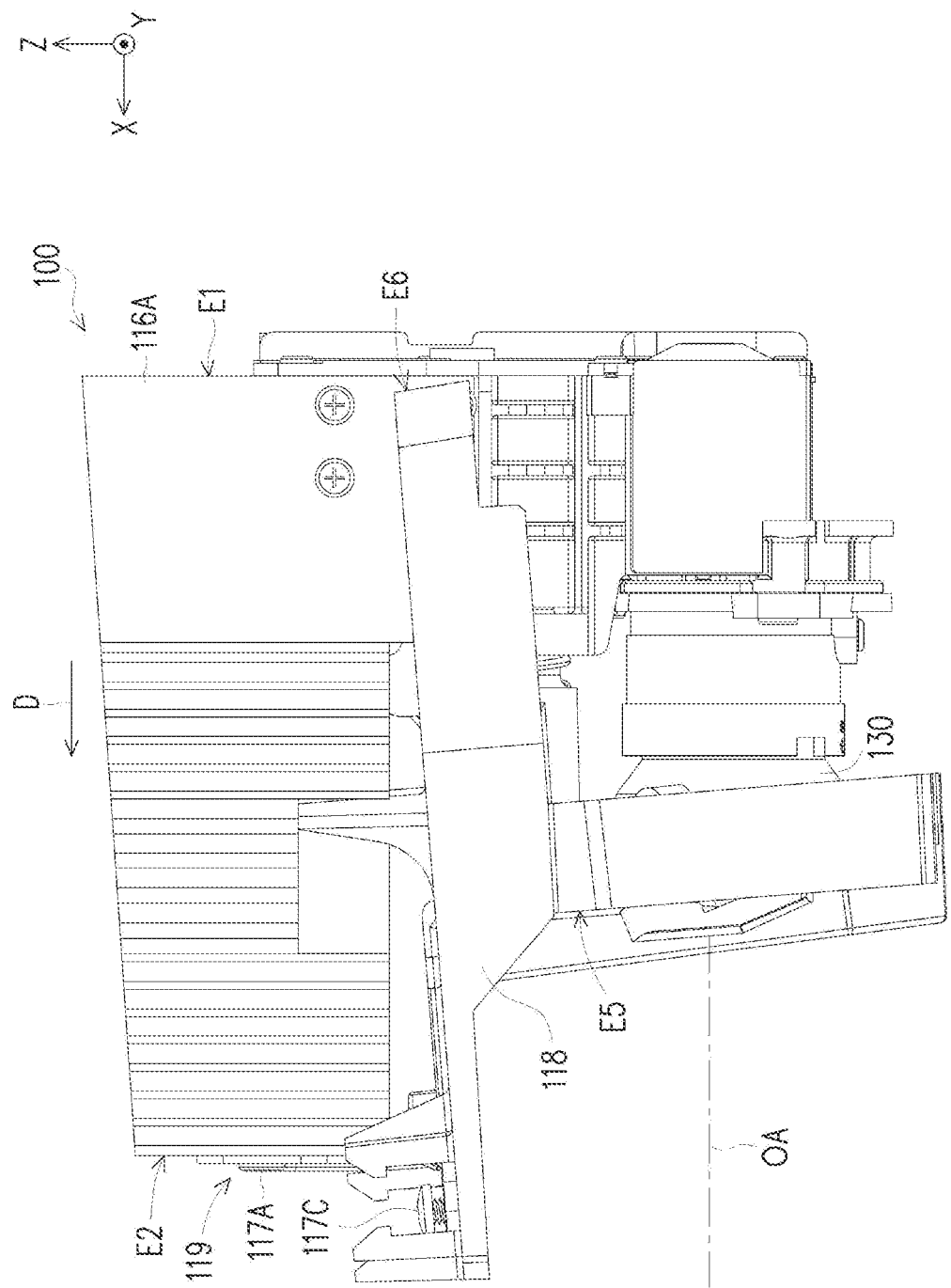
FIG. 9 is a side view of the projector of FIG. 2.

FIG. 9 is a side view of the projector of FIG. 2. With reference to FIG. 9, in this embodiment, the frame 118 has a front end E5 and a back end E6 opposite to each other, and the projection lens 130 and the connector 119 are both located at the front end E5. In addition, the first heat dissipation structure 116A and the second heat dissipation structure 116B (shown in FIG. 2) extend from the base 112 (shown in FIG. 3) to the connector 119 along an extension direction D. The extension direction D is parallel to an optical axis OA of the projection lens 130. In other embodiments not shown, the connector 119 may also be located at the back end E6 of the frame 118 instead of being located at the front end E5 of the frame 118 together with the projection lens 130. Moreover, in other embodiments not shown, the extension direction D of the first heat dissipation structure 116A and the second heat dissipation structure 116B from the base 112 to the connector 119 may also be perpendicular to the optical axis OA of the projection lens 130.

In summary of the foregoing, the embodiments of the disclosure have at least one of the following advantages or effects. The first heat dissipation structure and the second heat dissipation structure separated from each other are respectively configured to perform heat dissipation on the first color light-emitting unit and the second color light-emitting unit, to prevent heat from being conducted between the first heat dissipation structure and the second heat dissipation structure, affecting the normal heat dissipation of the first color light-emitting unit and/or the second color light-emitting unit. In addition, the accommodation space defined by the first heat dissipation structure and the second heat dissipation structure together may be configured to accommodate the third heat dissipation structure, for heat dissipation to be performed on the third color light-emitting unit within a limited configuration space by utilizing the third heat dissipation structure. Moreover, by fixing the first free end of the first heat dissipation structure and the second free end of the second heat dissipation structure by the connector, it is possible to prevent insufficient structural strength due to the configuration of the first heat dissipation structure and the second heat dissipation structure each in a form of a cantilever beam.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising a light source module, a light valve, and a projection lens, wherein
    the light source module is adapted to provide an illumination light beam and comprises a base, a first color light-emitting unit, a second color light-emitting unit, a first heat dissipation structure, a second heat dissipation structure, a frame and a connector, wherein
    the base has a first side surface and a second side surface;
    the first color light-emitting unit is disposed on the first side surface of the base;
    the second color light-emitting unit is disposed on the second side surface of the base;
    the first heat dissipation structure is connected to the first color light-emitting unit; and
    the second heat dissipation structure is connected to the second color light-emitting unit, wherein the first heat dissipation structure and the second heat dissipation structure are separated from each other and define an accommodation space together;
    the base is disposed on the frame;
    the first heat dissipation structure and the second heat dissipation structure are fixed on the frame by the connector;
    the light valve is located on a transmission path of the illumination light beam and is adapted to convert the illumination light beam into an image light beam; and
    the projection lens is located on a transmission path of the image light beam and is adapted to project the image light beam.

2. The projector according to claim 1, wherein the base has a third side surface, the light source module comprises a third color light-emitting unit and a third heat dissipation structure, the third color light-emitting unit is disposed on the third side surface of the base, and the third heat dissipation structure is connected to the third color light-emitting unit and is accommodated in the accommodation space.

3. The projector according to claim 1, wherein the first heat dissipation structure has a first recess and the second heat dissipation structure has a second recess, and the first recess and the second recess form the accommodation space together.

4. The projector according to claim 1, wherein the first heat dissipation structure has a first fixed end and a first free end opposite to each other, the second heat dissipation structure has a second fixed end and a second free end opposite to each other, the first fixed end and the second fixed end are fixed on the base, and the first free end and the second free end are fixed on the frame by the connector.

5. The projector according to claim 4, wherein the connector comprises a first extending portion, a second extending portion, and a third extending portion, and the first extending portion, the second extending portion, and the third extending portion respectively extend along different directions and are respectively connected to the first free end, the second free end, and the frame.

6. The projector according to claim 1, wherein the frame has a front end and a back end opposite to each other, the projection lens is located at the front end of the frame, and the connector is located at the front end of the frame or at the back end of the frame.

7. The projector according to claim 1, wherein the first heat dissipation structure and the second heat dissipation structure extend from the base to the connector along an extension direction, and the extension direction is parallel or perpendicular to an optical axis of the projection lens.

8. The projector according to claim 4, wherein the light source module comprises two screw elements, and the connector is screwed to the first free end and the second free end respectively by the two screw elements.

9. The projector according to claim 1, wherein the light source module comprises a screw element, and the connector is screwed to the frame by the screw element.

10. The projector according to claim 1, wherein the frame has a protruding pillar, and the protruding pillar is disposed through the connector.

11. The projector according to claim 1, wherein the light source module comprises an adhesive, and the adhesive is glued to the frame and the connector.

12. A light source module, comprising a base, a first color light-emitting unit, a second color light-emitting unit, a first heat dissipation structure, a second heat dissipation structure, a frame and a connector, wherein
    the base has a first side surface and a second side surface;
    the first color light-emitting unit is disposed on the first side surface of the base;
    the second color light-emitting unit is disposed on the second side surface of the base;
    the first heat dissipation structure is connected to the first color light-emitting unit;

the second heat dissipation structure is connected to the second color light-emitting unit, wherein the first heat dissipation structure and the second heat dissipation structure are separated from each other and define an accommodation space together;

the base is disposed on the frame; and the first heat dissipation structure and the second heat dissipation structure are fixed on the frame by the connector.

13. The light source module according to claim 12, wherein the base has a third side surface, the light source module comprises a third color light-emitting unit and a third heat dissipation structure, the third color light-emitting unit is disposed on the third side surface of the base, and the third heat dissipation structure is connected to the third color light-emitting unit and is accommodated in the accommodation space.

14. The light source module according to claim 12, wherein the first heat dissipation structure has a first recess and the second heat dissipation structure has a second recess, and the first recess and the second recess form the accommodation space together.

15. The light source module according to claim 12, wherein the first heat dissipation structure has a first fixed end and a first free end opposite to each other, the second heat dissipation structure has a second fixed end and a second free end opposite to each other, the first fixed end and the second fixed end are fixed on the base, and the first free end and the second free end are fixed on the frame by the connector.

16. The light source module according to claim 15, wherein the connector comprises a first extending portion, a second extending portion, and a third extending portion, and the first extending portion, the second extending portion, and the third extending portion respectively extend along different directions and are respectively connected to the first free end, the second free end, and the frame.

17. The light source module according to claim 15, comprising two screw elements, wherein the connector is screwed to the first free end and the second free end respectively by the two screw elements.

18. The light source module according to claim 12, comprising a screw element, wherein the connector is screwed to the frame by the screw element.

19. The light source module according to claim 12, wherein the frame has a protruding pillar, and the protruding pillar is disposed through the connector.

20. The light source module according to claim 12, comprising an adhesive, wherein the adhesive is glued to the frame and the connector.

* * * * *